United States Patent
Goto et al.

(10) Patent No.: US 8,667,327 B2
(45) Date of Patent: Mar. 4, 2014

(54) FAILOVER INFORMATION MANAGEMENT DEVICE, STORAGE PROCESSING DEVICE, AND FAILOVER CONTROL METHOD

(75) Inventors: Satoru Goto, Nagoya (JP); Yukihito Hara, Nagoya (JP)

(73) Assignee: Buffalo Inc., Nagoya-Shi (JP)

( * ) Notice: Subject to any disclaimer, the term of this patent is extended or adjusted under 35 U.S.C. 154(b) by 235 days.

(21) Appl. No.: 13/248,220

(22) Filed: Sep. 29, 2011

(65) Prior Publication Data
US 2012/0084599 A1    Apr. 5, 2012

(30) Foreign Application Priority Data
Oct. 5, 2010   (JP) ................................ 2010-225662

(51) Int. Cl.
*G06F 11/00* (2006.01)
(52) U.S. Cl.
USPC ............................................. 714/6.3; 714/11
(58) Field of Classification Search
USPC ........ 714/4.11, 4.1, 4.12, 4.2, 4.21, 6.2, 6.21, 714/6.22, 6.23, 6.3, 10–13
See application file for complete search history.

(56) References Cited

U.S. PATENT DOCUMENTS

| | | | | |
|---|---|---|---|---|
| 6,834,326 | B1 * | 12/2004 | Wang et al. | 711/114 |
| 7,240,188 | B2 * | 7/2007 | Takata et al. | 713/1 |
| 7,472,241 | B2 * | 12/2008 | Uchiyama et al. | 711/162 |
| 7,681,002 | B2 * | 3/2010 | Seki et al. | 711/165 |
| 7,694,092 | B2 * | 4/2010 | Mizuno | 711/162 |
| 2009/0024722 | A1 * | 1/2009 | Sethuraman et al. | 709/220 |

FOREIGN PATENT DOCUMENTS

| | | |
|---|---|---|
| JP | 2008-97276 A | 4/2008 |
| JP | 2010-128644 | 6/2010 |

OTHER PUBLICATIONS

Office Action issued Aug. 28, 2012, in Japanese Patent Application No. 2010-225662 with English translation.

* cited by examiner

*Primary Examiner* — Dieu-Minh Le
(74) *Attorney, Agent, or Firm* — Oblon, Spivak, McClelland, Maier & Neustadt, L.L.P.

(57) ABSTRACT

A failover information management device manages information on a failover system including two storage processing devices to each of which a storage medium is connectable. The failover information management device stores unsuitability information from which a combination of two storage processing devices determined to be unsuitable for constituting the failover system is identifiable.

7 Claims, 5 Drawing Sheets

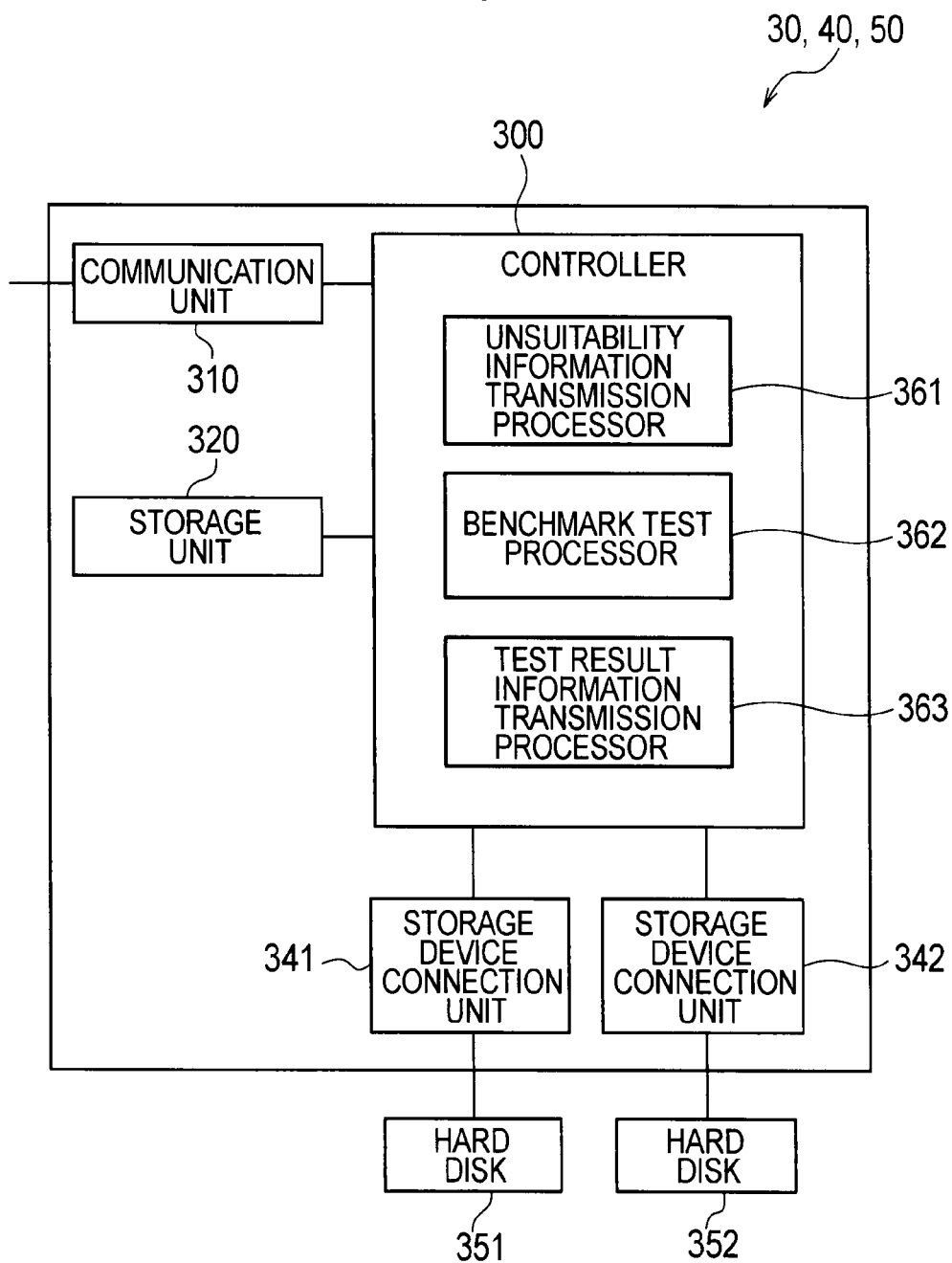

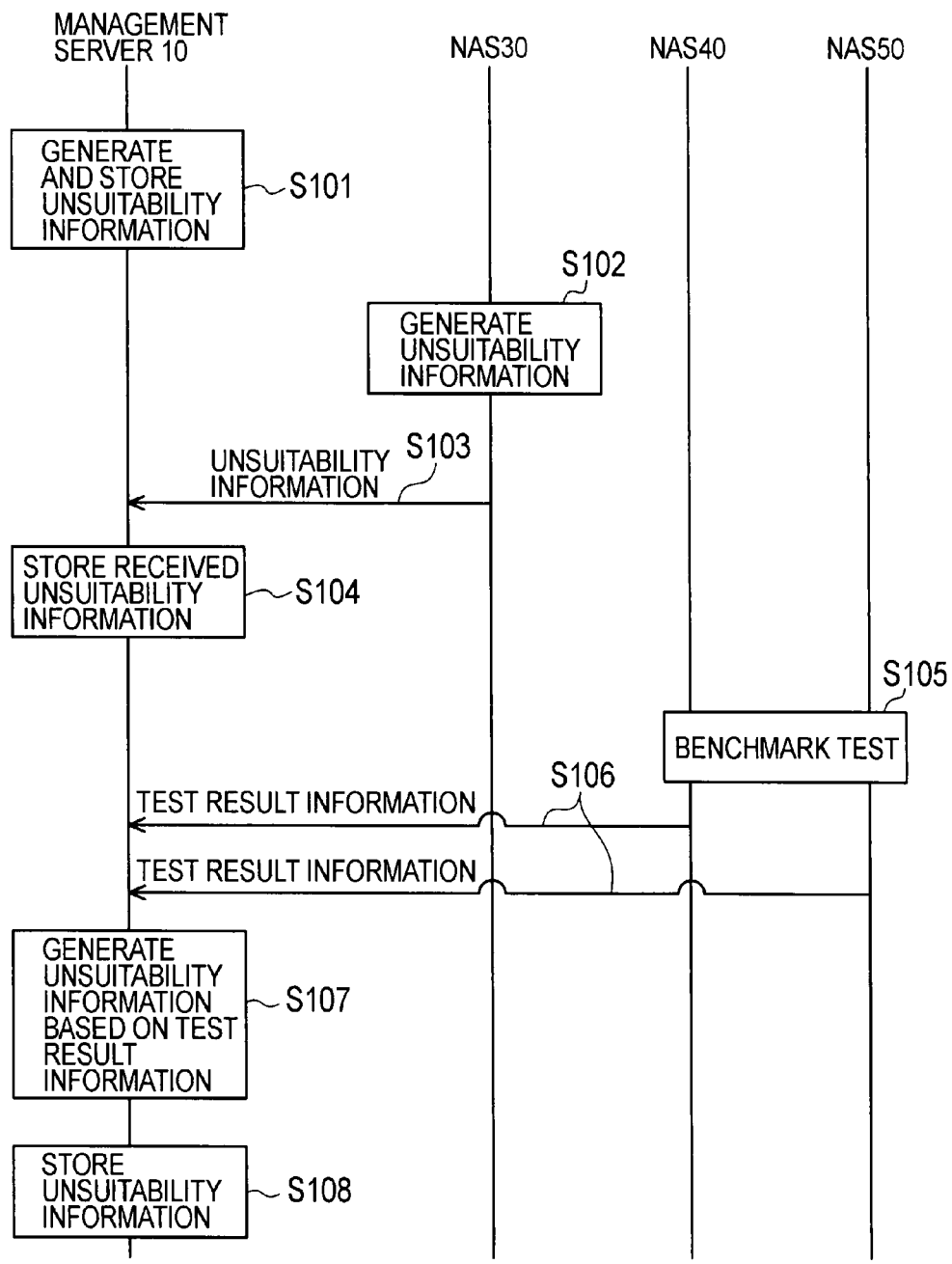

FAILOVER INFORMATION MANAGEMENT DEVICE, STORAGE PROCESSING DEVICE, AND FAILOVER CONTROL METHOD

CROSS REFERENCE TO RELATED APPLICATION

This application is based upon and claims the benefit of priority from, the prior Japanese Patent Application No. 2010-225662 filed on Oct. 5, 2010; the entire contents of which are incorporated herein by reference.

BACKGROUND OF INVENTION

1. Field of Invention

This invention relates to a failover information management device for managing information on a failover system including two storage processing devices to each of which a storage medium is connectable, to a storage processing device constituting the failover system, and to a failover control method used for the failover information management device.

2. Description of the Related Art

Heretofore, some systems have employed a failover system to improve the reliability of the systems. In a failover system, for example, one of two servers serves as a main and the other serves as a backup. The main server processes tasks under normal conditions, and the backup server takes over the tasks of the main server when the main server fails (see for example Japanese Patent Application Publication No. 2010-128644).

In recent years, storage processing devices called network attached storages (NAS) have been widely used. Plural hard disks can be connected to the NAS, and various types of content data such as video and audio data can be stored in the hard disks. Upon receiving a request for content data from a terminal device via a network, the NAS transmits the requested content data to the terminal device via the network. The terminal device reproduces the content of the received content data.

A proposal has been made to build a failover system comprising NAS. In a failover system including two NAS, one NAS is the main and the other NAS is the backup. As similar to the above system, the main NAS processes tasks under normal conditions, and the backup NAS takes over the tasks of the main NAS when the main NAS fails.

SUMMARY OF INVENTION

The technique of Japanese Patent Application Publication No. 2010-128644 described above enables the failover system by combining a main and a backup together based on information on the minimum performance required for the backup.

However, the information on the minimum performance required for the backup is associated with each of the tasks of the main on a one-to-one basis, and it is unclear whether a certain device is suitable as the backup for the main as a whole. Thus, unless two devices are actually combined together, a judgment cannot be made as to whether the two devices can constitute a failover system.

In order to solve the above problem, this invention aims to provide a failover information management device, a storage processing device, and a failover control method, which are capable of easily judging the suitability of a main and a backup in a failover system.

According to one of the features of this invention, there is provided a failover information management device for managing information on a failover system including two storage processing devices to each of which a storage medium is connectable, the failover information management device including a storage unit for storing unsuitability information from which a combination of two storage processing devices determined to be unsuitable for constituting the failover system is identifiable.

The failover information management device as described above stores the unsuitability information that makes it possible to identify a combination of two storage processing devices determined to be unsuitable for constituting the failover system, i.e. unsuitable as a combination of the main and the backup. Accordingly, in the sale of a certain storage processing device or on any other occasion, the failover information management device can, for example, provide information on other storage processing devices unsuitable as a main or backup for the certain storage processing device, and can facilitate a judgment on the suitability of the main and the backup in the failover system.

According to another feature of this invention, the failover information management device further comprises an unsuitability information receiver for receiving the unsuitability information from each of the storage processing devices connected to the failover information management device via a network.

According to another feature of this invention, the failover information management device further comprises a test result receiver for receiving information on the result of a benchmark test in which two storage processing devices are examined in terms of the configuration of the failover system; and a judgment unit for judging whether a combination of the two storage processing devices examined in the benchmark test is unsuitable for constituting the failover system, on the basis of the information on the result of the benchmark test which is received by the test result receiver, wherein the storage unit stores the unsuitability information from which the combination of the two storage processing devices determined to be unsuitable by the judgment unit is identifiable.

According to one of the features of this invention, there is provided a storage processing device to which a storage medium is connectable and which constitutes a failover system with a different storage processing device, the storage processing device comprising: a test processor for performing a benchmark test on a configuration of the failover system with the different storage processing device; and a transmitter for transmitting information on a test result obtained by the test processor to a failover information management device managing information on the failover system.

According to one of the features of this invention, there is provided a failover control method in a failover information management device for managing information on a failover system including two storage processing devices to each of which a storage medium is connectable, the failover control method including the step of storing unsuitability information from which a combination of two storage processing devices determined to be unsuitable for constituting the failover system is identifiable.

BRIEF DESCRIPTION OF DRAWINGS

FIG. 4 is a diagram of the configuration of a NAS of the embodiment of this invention.

FIG. 5 is a sequence diagram of an operation of a failover system of the embodiment of this invention.

DESCRIPTION OF EMBODIMENTS

Next, an embodiment of this invention will be described with reference to the drawings. Descriptions are given of the configuration of a failover management system, the configuration of a management server, the configuration of a NAS, the operation of the failover management system, the obtained result, and other embodiments.

(1) Configuration of Failover Management System

Figure 1:
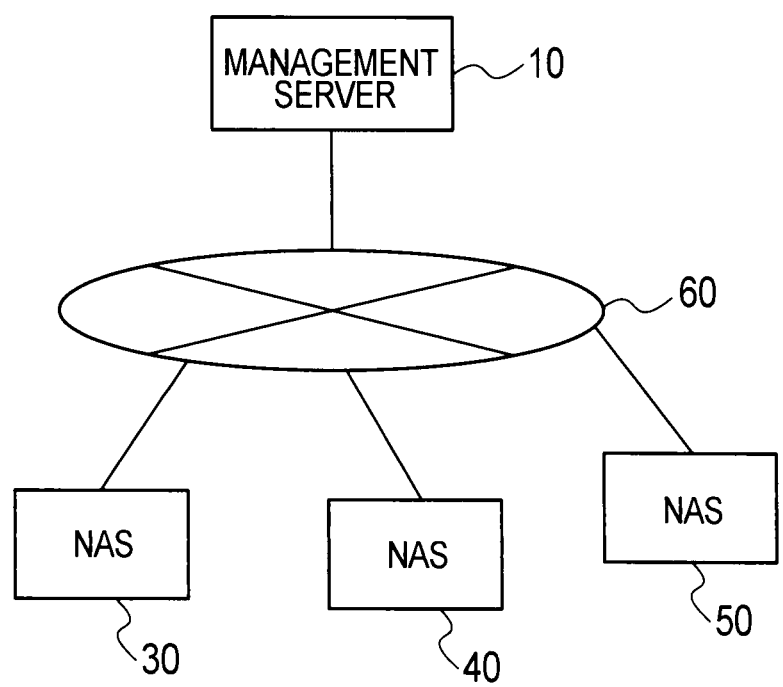
FIG. 1 is an overall structural diagram of a failover management system of an embodiment of this invention.

FIG. 1 is an overall structural diagram of a failover management system. The failover management system shown in FIG. 1 includes a management server 10 which is a failover information management device, a network attached storage (NAS) 30, a NAS 40, and a NAS 50 each of which is a storage processing device, and a communication network 60 connecting the management server 10 with the NAS 30 to NAS 50.

In the failover management system of the embodiment, any one of the NAS 30 to NAS 50 can be a main in a failover system, and any one of the remaining NAS can be a backup in the failover system. The failover system consists of a main NAS and a backup NAS. The main NAS and the backup NAS have their settings and data synchronized with each other. The main NAS processes tasks under normal conditions, and the backup NAS takes over the tasks of the main NAS if the main NAS fails.

(2) Configuration of Management Server

Figure 2:
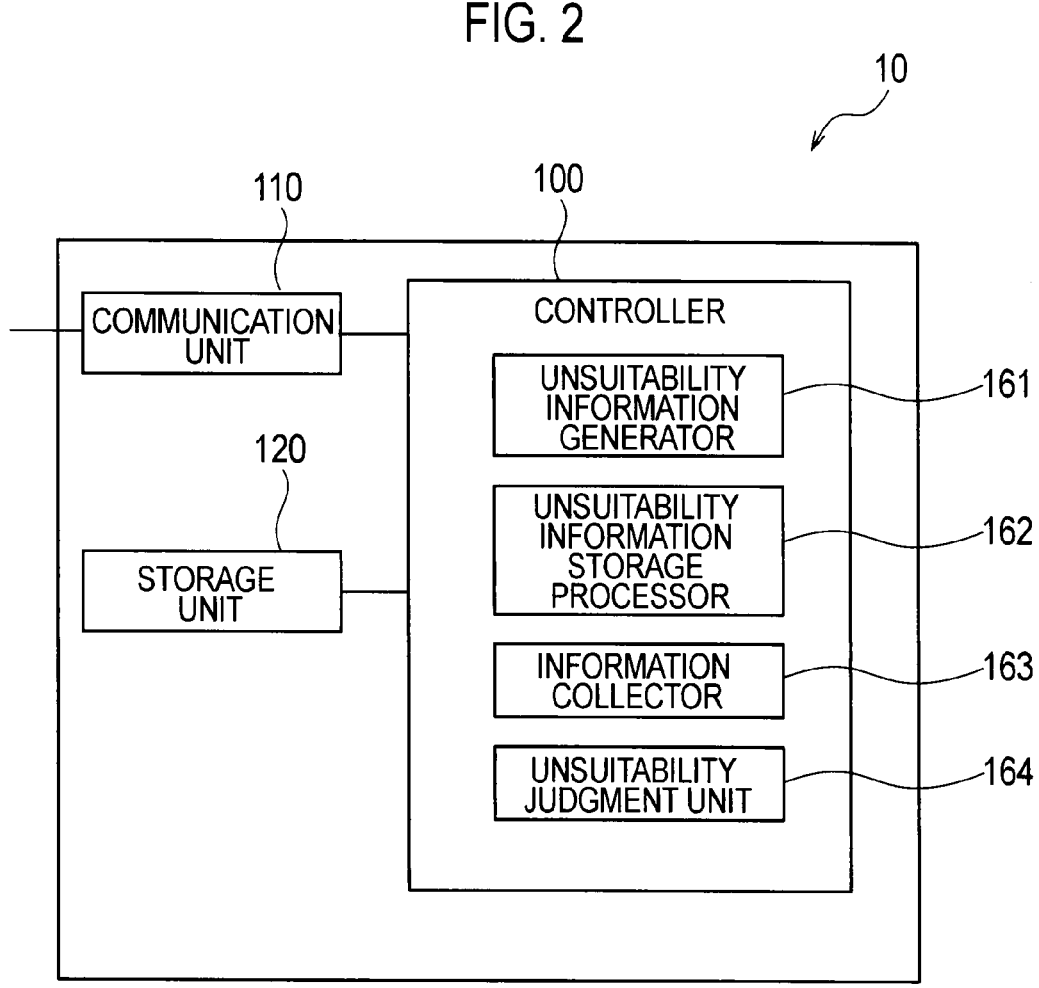
FIG. 2 is a structural diagram of a management server of the embodiment of this invention.

FIG. 2 is a structural diagram of the management server 10. The management server 10 manages information on a fail over system. The management server 10 shown in FIG. 2 includes a controller 100, a communication unit 110, and a storage unit 120.

The controller 100 is, for example, a CPU, and controls various functions which the management server 10 has.

The communication unit 110 is, for example, a LAN card, and a media access control (MAC) address is assigned thereto. The communication unit 110 is a communication interface for communicating with external devices, and communicates with the NAS 30 to NAS 50 via the communication network 60. The storage unit 120 is, for example, a NAND flash memory, and stores various types of information used for the control of the management server 10 and the like.

The controller 100 includes an unsuitability information generator 161, an unsuitability information storage processor 162, an information collector 163, and an unsuitability judgment unit 164.

The unsuitability information generator 161 generates unsuitability information including information from which a combination of two NAS determined to be unsuitable for constituting the failover system is identifiable. The unsuitability information generator 161 generates the unsuitability information in accordance with an operation which an operator performs at an operating unit not illustrated.

The unsuitability information comprises the product ID of a NAS selected as a main and the product ID of a NAS selected as a backup associated with the main, the combination of the main and the backup being unsuitable for constituting a failover system. The product IDs are identification information assigned to the same type of NAS such as model numbers.

Figure 3:
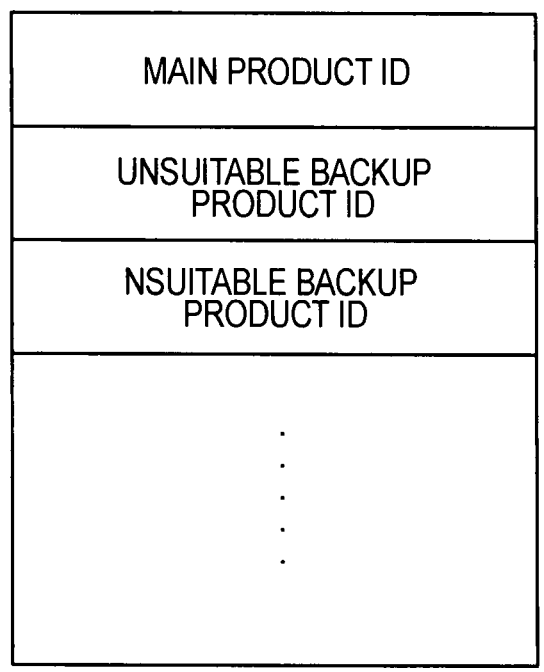
FIG. 3 is a diagram of an example of unsuitability information of the embodiment of this invention.

FIG. 3 is a diagram of an example of unsuitability information. The unsuitability information shown in FIG. 3 is an example of the case where there are plural NAS each of which, if serving as a backup for a main NAS, forms an unsuitable combination for constituting a failover system with the main NAS. In FIG. 3, the main product ID is associated with the plural unsuitable backup product IDs.

The unsuitability information storage processor 162 causes the storage unit 120 to store the unsuitability information generated by the unsuitability information generator 161. In this processing, when the main product ID in the unsuitability information to be stored matches the main product ID in the unsuitability information already stored in the storage unit 120, the unsuitability information storage processor 162 adds the unsuitable backup product ID in the unsuitability information to be stored to the unsuitability information which is already stored in the storage unit 120 and which includes the same main product ID as the main product ID in the unsuitability information to be stored.

The information collector 163 receives the unsuitability information transmitted from the NAS 30 to NAS 50 via the communication network 60 and the communication unit 110.

When the information collector 163 receives the unsuitability information, the unsuitability information storage processor 162 causes the storage unit 120 to store this unsuitability information. As described above, when the main product ID in the unsuitability information to be stored matches the main product ID in the unsuitability information already stored in the storage unit 120, the unsuitability information storage processor 162 adds the unsuitable backup product ID in the unsuitability information to be stored to the unsuitability information which is already stored in the storage unit 120 and which includes the same main product ID as the main product ID in the unsuitability information to be stored.

Furthermore, the information collector 163 receives the test result information transmitted from the NAS 30 to NAS 50 via the communication network 60 and the communication unit 110. The test result information shows the result of a benchmark test on the suitability of the failover system under the assumption that one of the NAS 30 to NAS 50 constitutes a failover system with each of the other NAS 30 to NAS 50.

When the benchmark test is performed on the combination of the one of the NAS 30 to NAS 50 as the main and another NAS as the backup, the test result information includes the product ID of the one of the NAS 30 to NAS 50 as the main product ID and the product ID of the other NAS as the backup product ID. Moreover, when the benchmark test is performed on the combination of the one of the NAS 30 to NAS 50 as the backup and another NAS as the main, the test result information includes the product ID of the one of the NAS 30 to NAS 50 as the backup product ID and the product ID of the other NAS as the main product ID.

When the information collector 163 receives the test result information, the unsuitability judgment unit 164 quantifies the suitability of a failover system including the combination of the one of the NAS 30 to NAS 50 and the other NAS, on the basis of the received test result information. Then, when the value of the suitability is equal to or larger than a predetermined threshold, the unsuitability judgment unit 164 judges that the combination of the one of the NAS 30 to NAS 50 and the other NAS is suitable for constituting the failover system. On the other hand, when the value of the suitability is lower than the predetermined threshold, the unsuitability judgment unit 164 judges that the combination of the one of the NAS 30 to NAS 50 and the other NAS is unsuitable for constituting the failover system.

The unsuitability information generator 161 generates the unsuitability information in which the product IDs of the one of the NAS 30 to NAS 50 and the other NAS which form a combination judged to be unsuitable for constituting the failover system are included with either one of the product IDs included as the main product ID, and with the other product ID included as the unsuitable backup product ID.

When the unsuitability information generator 161 generates the unsuitability information, the unsuitability information storage processor 162 causes the storage unit 120 to store this unsuitability information. As described above, when the main product ID in the unsuitability information to be stored matches the main product ID in the unsuitability information already stored in the storage unit 120, the unsuitability information storage processor 162 adds the unsuitable backup product ID in the unsuitability information to be stored to the unsuitability information which is already stored in the storage unit 120 and which includes the same main product ID as the main product ID in the unsuitability information to be stored.

(3) Configuration of NAS

FIG. 4 is a view of the configuration of the NAS 30 to NAS 50. The NAS 30 to NAS 50 shown in FIG. 4 each include a controller 300, a communication unit 310, a storage unit 320, a storage device connection unit 341, and a storage device connection unit 342.

The controller 300 is, for example, a CPU, and controls various functions which the NAS has.

The communication unit 310 is, for example, a LAN card, and a MAC address is assigned thereto. The communication unit 310 is a communication interface communicating with external devices, and communicates with the management server 10 and the other NAS via the communication network 60.

The storage unit 320 is, for example, a NAND flash memory, and stores various types of information used for the control of the NAS 30 to NAS 50 and the like. The storage unit 320 stores various types of information required for the failover system. The storage device connection unit 341 is used to connect a hard disk 351. The storage device connection unit 342 is used to connect a hard disk 352. When one of the NAS 30 to NAS 50 and the other NAS constitute a failover system, the hard disk 351 and the hard disk 352 form a RAID configuration and data, e.g. user data, to be synchronized between the main and the backup is stored therein.

The controller 300 includes an unsuitability information transmission processor 361, a benchmark test processor 362, and a test result information transmission processor 363.

The unsuitability information transmission processor 361 sends to the management server 10 the unsuitability information including information from which a combination of two NAS determined to be unsuitable for constituting the failover system can be identified. The controller 300 generates unsuitability information on the basis of an operation which an operator performs at an operating portion not illustrated. The unsuitability information transmission processor 361 transmits the generated unsuitability information to the management server 10 via the communication unit 310 and the communication network 60.

The benchmark test processor 362 performs various types of processing for the benchmark test on the suitability of the failover system under the assumption that the NAS including the benchmark test processor 362 itself and each of the other NAS constitute a failover system while either one of the NAS serves as a main, and the other NAS serves as a backup. When the benchmark test is performed on the combination of the NAS including itself as the main and the other NAS as the backup, the benchmark test processor 362 generates the test result information including the product ID of the NAS including itself as the main product ID and the product ID of the other NAS as the backup product ID. On the other hand, when the benchmark test is performed on the combination of the NAS including itself as the backup and the other NAS as the main, the benchmark test processor 362 generates the test result information including the product ID of the NAS including itself as the backup product ID and the product ID of the other NAS as the main product ID.

The test result information transmission processor 363 sends to the management server 10 the test result information generated by the benchmark test processor 362. The test result information transmission processor 363 transmits the test result information to the management server 10 via the communication unit 310 and the communication network 60.

(4) Operation of Failover Management System

FIG. 5 is a sequence diagram of an operation of the failover management system.

In Step S101, the management server 10 generates the unsuitability information in accordance with the operation of an operator, and stores this unsuitability information.

In Step S102, the NAS 30 generates the unsuitability information in accordance with the operation of the operator. In Step S103, the NAS 30 transmits the unsuitability information. The management server 10 receives the unsuitability information. In Step S104, the management server 10 stores the received unsuitability information.

In step S105, the NAS 40 and the NAS 50 each performs the benchmark test. In Step S106, the NAS 40 and the NAS 50 each transmit the test result information. The management server 10 receives the test result information from each of the NAS 40 and the NAS 50. Note that, when the benchmark test is performed in which one of the NAS 40 and the NAS 50 is the main and the other is the backup in Step S105, only one of the NAS 40 and the NAS 50 can transmit the test result information.

In Step S107, the management server 10 generates the unsuitability information based on the received test result information. In Step S108, the management server 10 stores the generated unsuitability information.

(5) Obtained Result

In the failover management system of the embodiment, the management server 10 stores the unsuitability information in which the product ID (main product ID) of the main NAS is associated with the product ID (unsuitable backup product ID) of the NAS which, if serving as the backup for the main NAS, forms as the failover system an unsuitable combination with the main NAS. Accordingly, in the sale of the NAS or on any other occasion, the failover management system can, for example, provide information on other NAS unsuitable as a main or backup for the NAS, and allows those provided with the information to easily judge the suitability of the main and the backup in the failover system.

Moreover, in the failover management system of the embodiment, the management server 10 can receive the unsuitability information from each of the NAS 30 to NAS 50 via the communication network 60. Furthermore, the management server 10 receives the test result information showing the result of the benchmark test on the suitability of the failover system under the assumption that one of the NAS 30 to NAS 50 constitutes a failover system with each of the other NAS. Then, the management server 10 stores the unsuitability information generated based on the test result information. Accordingly, the management server 10 can store and provide many pieces of unsuitability information.

(6) Other Embodiments

As described above, the details of this invention have been disclosed by using the embodiments of this invention. However, it should not be understood that the description and drawings which constitute part of this disclosure limit this invention. From this disclosure, various alternative embodiments, examples, and operation techniques will be easily found by those skilled in the art.

In the embodiment described above, the hard disk is connected to each of the NAS 30 to NAS 50. However, a storage medium connectable to each of the NAS 30 to NAS 50 is not limited to a hard disk. For example, a storage medium such as a solid state drive (SSD), a flash memory, or a SD card may be connected.

In this manner, this invention naturally includes various embodiments not specifically described herein.

What is claimed is:

1. A failover information management device, comprising:
   circuitry configured to:
   generate or receive unsuitability information that indicates a combination of two storage processing devices which is determined to be unsuitable to form a failover system, the unsuitability information identifying a primary storage processing device and a secondary storage processing device, which is determined not to be suitable to take over a task performed by the primary storage processing device when the primary storage processing device fails, and
   store the unsuitability information in a computer-readable storage medium for subsequent access.

2. The failover information management device according to claim 1, wherein the circuitry is further configured to:
   receive the unsuitability information from one of a plurality of storage processing devices connected to the failover information management device via a network.

3. The failover information management device according to claim 1, wherein the circuitry is further configured to:
   receive information on a result of a benchmark test in which the two storage processing devices are examined in terms of the configuration of the failover system; and
   judge whether the combination of the two storage processing devices examined in the benchmark test cannot be utilized to form the failover system, on the basis of the information on the result of the benchmark test which is received by the circuitry, wherein
   the computer-readable storage medium stores the unsuitability information from which the combination of the two storage processing devices determined to be unsuitable by the circuitry is identifiable.

4. The failover information management device according to claim 1, wherein the unsuitability information includes a device identifier for each of the two storage processing devices, and identical storage processing devices share the same device identifier.

5. A storage processing device to which a storage medium is connectable and which constitutes a failover system with a different storage processing device, the storage processing device comprising:
   a test processor configured to perform a benchmark test on a configuration of the failover system with the different storage processing device; and
   a transmitter configured to transmit information on a test result obtained by the test processor to a failover information management device managing information on the failover system, the test result being used to determine whether a combination of the storage processing device and the different storage processing device are unsuitable for constituting the failover system.

6. A failover control method in a failover information management device for managing unsuitability information, the failover control method comprising:
   generating or receiving the unsuitability information that indicates a combination of two storage processing devices which is determined to be unsuitable to form a failover system, the unsuitability information identifying a primary storage processing device and a secondary storage processing device, which is determined not to be suitable to take over a task performed by the primary storage processing device when the primary storage processing device fails, and
   store the unsuitability information in a computer-readable storage medium for subsequent access.

7. The failover information management device according to claim 1, wherein the unsuitability information indicates that one of the two storage processing devices is not suitable to serve as a backup for the other of the two storage processing devices.

* * * * *